Figure 1:
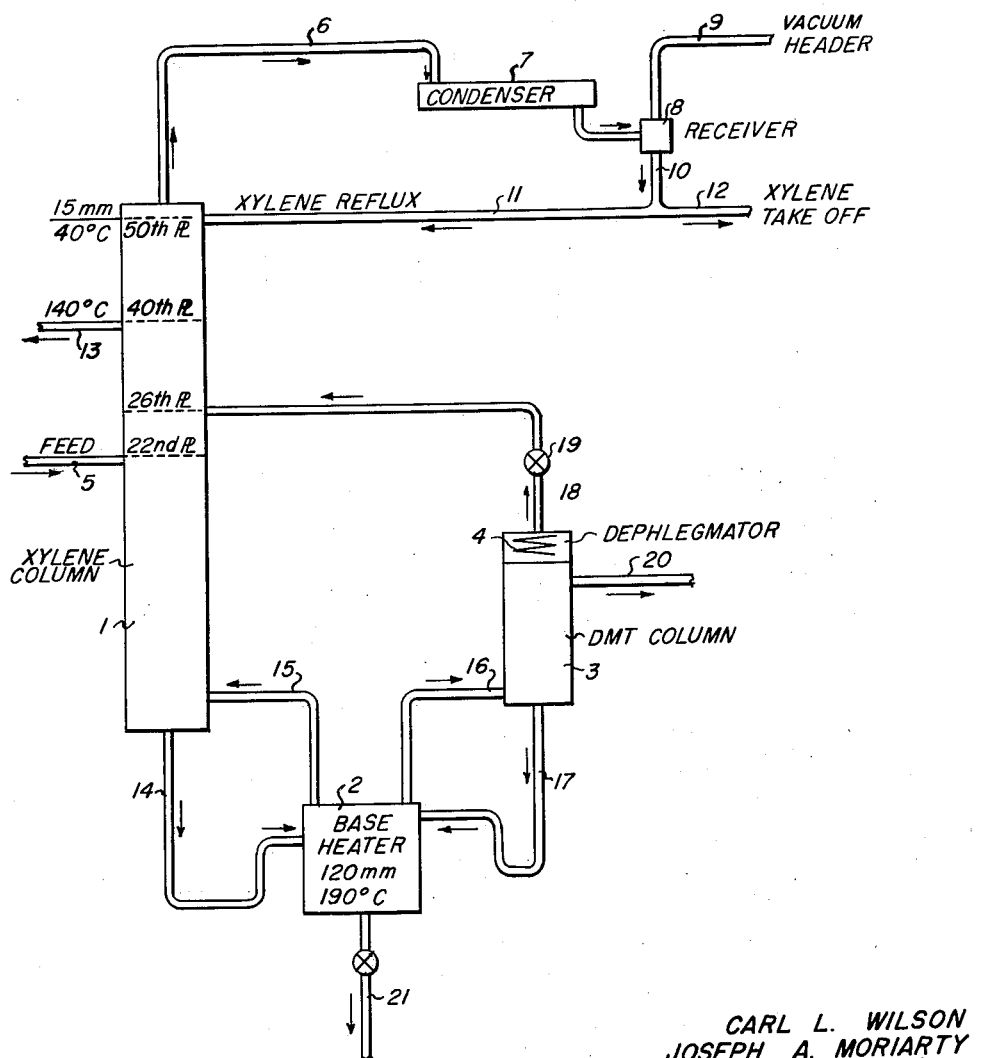

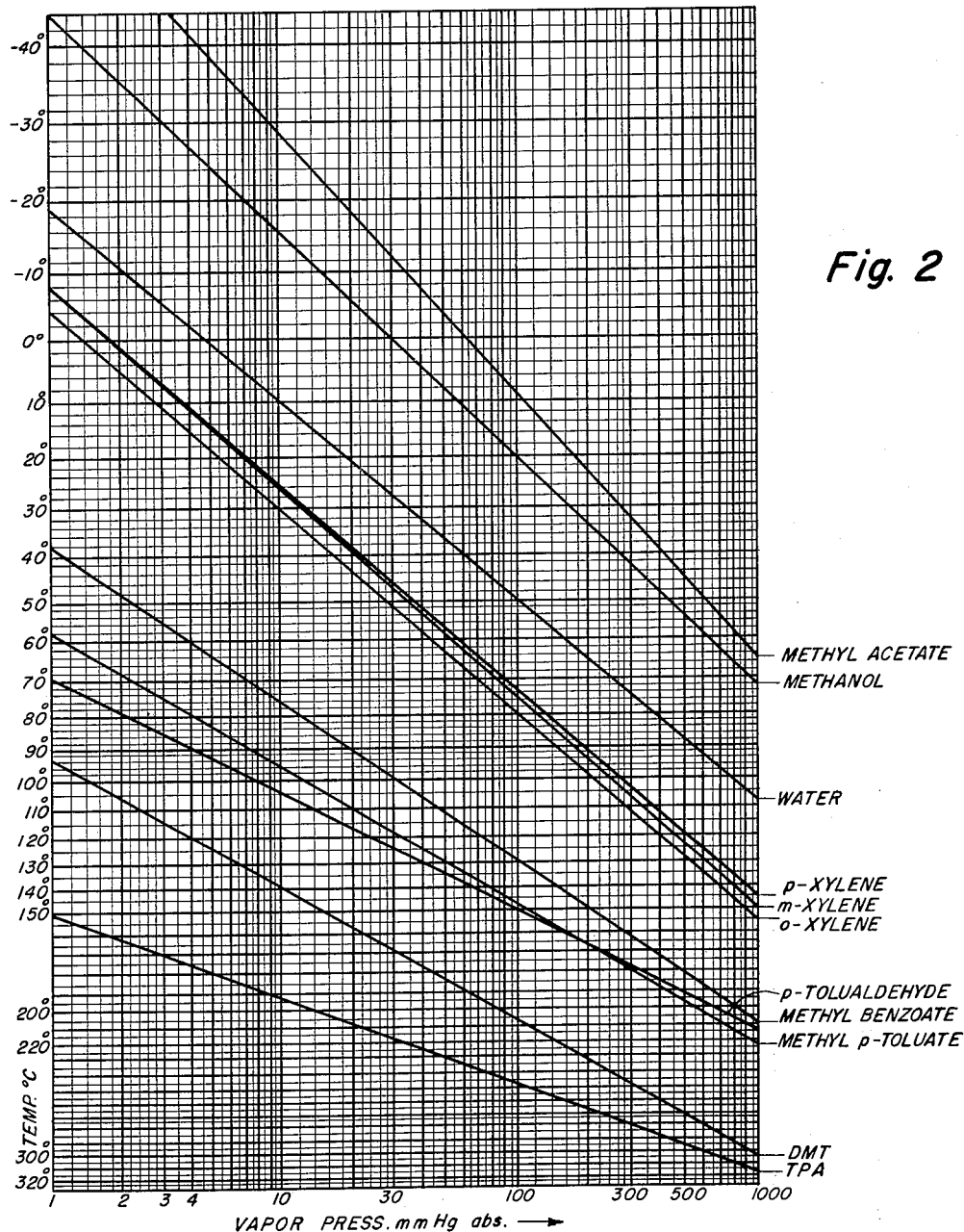

United States Patent Office 2,992,168
Patented July 11, 1961

2,992,168
PROCESS OF PURIFYING DIMETHYL TEREPH-THALATE AND OTHER COMPOUNDS WHICH SUBLIME
Carl L. Wilson and Joseph A. Moriarty, Kingsport, Tenn., assignors to Eastman Kodak Company, Rochester, N.Y., a corporation of New Jersey
Filed July 9, 1959, Ser. No. 826,077
6 Claims. (Cl. 202—40)

This invention relates to the purification of dimethyl terephthalate by distillation. More particularly, it relates to a method of avoiding sublimation of dimethyl terephthalate while it is being distilled under reduced pressure. In the purification of dimethyl terephthalate by distillation, it is necessary to separate it not only from lower boiling compounds but from higher boiling acids, half esters and polymers. In the prior art, this has been accomplished by feeding the crude dimethyl terephthalate to a series of distillation columns, removing the lowest boiling compound or compounds in the first column, removing the intermediate boiling compounds in the second column, and distilling dimethyl terephthalate from the third column. In this distillation train the dimethyl terephthalate is condensed in a hot condenser. The melting point of dimethyl terephthalate is 141° C., and the compound sublimes. Sublimation causes stoppage problems in the vent lines. This is especially true if the distillation is carried out under reduced pressure, since small leaks of air into the system intensify the problem. On the other hand, it is desirable to distill dimethyl terephthalate under reduced pressure, as this enables the distillation to be carried out at lower temperatures, thus slowing down decomposition of the ester.

In the prior art, in the distillation of a material with a high melting point, a system of hot condensers is used to maintain the material above its melting point while being condensed. To reduce problems of sublimation a pair of cold condensers are operated in parallel on the vent lines from the hot condensers. These condensers are operated on stream alternately; one is being melted out while the other is freezing out material from the vent line. In reduced pressure distillation of dimethyl terephthalate and condensation with a hot condenser, dimethyl terephthalate will sublime and be carried as much as 10 to 30 feet into the vapor lines leading away from the condenser, causing stoppage of these lines.

We have developed a continuous process for distillation of a xylene solution of dimethyl terephthalate at reduced pressure (10–400 mm. Hg) without a sublimation problem. According to our invention, two distilling columns are connected to the same base heater. In the first column, the xylene is distilled off at the head of the column, a considerable portion of it being returned as reflux; impurities whose boiling points are between those of xylene and dimethyl terephthalate are removed as a side stream, and the dimethyl terephthalate and high boiling impurities are overflowed from the base into the base heater. The second column has a dephlegmator at its head. The dimethyl terephthalate is vaporized into this column, where it is condensed for reflux and take-off, the high-boiling impurities being withdrawn as sludge from the base heater. The purified dimethyl terephthalate is taken off as a side stream at a point below the dephlegmator. The sublimation problem is eliminated by allowing a small amount of dimethyl terephthalate vapor to pass the condensing surface of the dephlegmator and re-enter the xylene column by venting the top of the dimethyl terephthalate column to a point in the xylene column where the temperature of the mixture on the plate of re-entry is above the melting point of the dimethyl terephthalate. The point of re-entry should be high enough on the xylene column so that the pressure drop across the dimethyl terephthalate column will be less than the pressure drop from the base heater to the point of re-entry in the xylene column. This will allow the pressure to be reduced at the top of the dimethyl terephthalate column enough to cause a flow up this column. A restriction in the vapor line from the dimethyl terephthalate column into the xylene column will restrict the flow into the xylene column to a minimum. This flow should be approximately 5% of the flow up the xylene column or the dimethyl terephthalate column, but it is not necessarily restricted to this amount. The system will work with any flow, no matter how small, so long as it reduces the pressure at the top of the dimethyl terephthalate column to less than the pressure at the base of the same column by a differential equal to the inherent operating pressure drop in the column.

The mode of carrying out our invention may be understood by referring to FIGURE I, in which 1 is the xylene column, 2 the base heater, and 3 the dimethyl terephthalate column with a dephlegmator 4 above the top plate. The feed enters the xylene column 1 through feed line 5. The xylene is distilled off in essentially pure form through line 6 into condenser 7, whence it flows into receiver 8, attached to a vacuum header by line 9. From the receiver 8, the xylene is drawn off by line 10 to reflux through line 11 to a point near the top of the xylene column 1 and to take-off through line 12. The xylene taken off is re-used in feed to the distillation column. The medium-boiling impurities are withdrawn from the xylene column 1 at a point somewhat above the feed, through line 13. The dimethyl terephthalate and the high-boiling impurities overflow from the base of the xylene column 1 through line 14 to the base heater 2, which supplies vapor feed to column 1 through line 15, and to the dimethyl terephthalate column 3 through line 16. In column 3, the dimethyl terephthalate distills up through the column. Most of it is condensed by the dephlegmator 4. From the top of the dephlegmator a small amount of vapor is drawn off through line 18 and restriction 19 and returned to the xylene column 1 at a point which may be intermediate the feed 5 and the medium-boiler draw-off 13, or may be slightly below the feed. A considerably larger portion of the purified dimethyl terephthalate, in liquid form, is taken off as a sidestream from column 3 through line 20, at a point somewhat below the dephlegmator 4. The major portion of the condensed dimethyl terephthalate, together with the high-boiling impurities, is refluxed through line 17 to the base heater. The impurities, along with some dimethyl terephthalate, are sludged from the base heater through line 21.

The present invention not only eliminates the sublimation problem, but gives an added advantage in a reduction in the amount of surface required for considering the reflux and take-off of dimethyl terephthalate. A smaller area of condensing surface can be used due to the use of a cool or cold condensing surface.

The operation of our invention is illustrated by, but not limited to, the following example.

*Example.*—One hundred pounds per hour of feed consistion of 48 lbs. xylene, 2 lbs. methyl p-toluate and p-toluic acid, 48 lbs. dimethyl terephthalate, and 2 lbs. terephthalic acid and monohydrogen methyl terephthalate is fed through line 5 to the 22nd plate (counting up from the base) of a 10-ft. distillation column 1 containing 50 plates. Minor quantities of methanol, methylacetate, p-tolualdehyde, methyl benzoate may also be present. Figure II is a Cox chart of the boiling points, at various pressures, of the major and most of the minor components of the feed. DMT stands for dimethyl terephthalate, and TPA stands for terephthalic acid. Melting points are as follows:

| | °C. |
|---|---|
| Dimethyl terephthalate | 140–142 |
| Methyl p-toluate | 33–34 |
| Mixed xylenes (Solvesso xylol) | −70 |
| Methyl hydrogen terephthalate | 230 |
| Terephthalic acid | 400 |

48 lbs. of xylene per hour is removed from the top of the xylene distillation column 1 through line 6, condenser 7, receiver 8, and lines 10 and 12. 2.7 lbs. of material per hour is removed from the 40th plate through line 13. The material removed from the 40th plate analyzes approximately 5% p-toluic acid, 20% dimethyl terephthalate and 75% methyl p-toluate. A reflux ratio of 3:1 is maintained at the top of the xylene column 1, the reflux returning through line 11. The temperature at the 50th plate of the xylene column 1 runs about 40° C. when the column is operated so that the absolute pressure at that plate is 15 mm. The temperature at the 40th plate is about 140° C. The pressure at the base of the xylene column 1 is about 120 mm., and the temperature in the base about 190° C. The pressure at the top of the 10-plate dimethyl terephthalate column 3 should be less than 90 mm. The pressure at the 26th plate of the xylene column 1, to which the line 18 leads from the dimethyl terephthalate column 3, should be about 65 mm. This difference in pressure between the top of the dimethyl terephthalate column 3 and the 26th plate of the xylene column 1 allows continual reduction of the pressure at the top of the dimethyl terephthalate column 3 and assures continual reflux and take-off from this column. Regulation of the cooling medium on the dephlegmator 4 on the dimethyl terephthalate column 3 will provide the necessary reflux and take-off ratio. This column should reflux 111 lbs. of dimethyl terephthalate through line 17 per 37 lbs. of dimethyl terephthalate take-off through line 20. A sludge of 12 lbs. per hour is continually removed from the base heater 2 through line 21 to remove the acid. This sludge will contain approximately 10% acid calculated as terephthalic acid. A flow of approximately 5 lbs. per hour of dimethyl terephthalate should pass through the vapor line 18 from the dimethyl terephthalate column 3 into the 26th plate of the xylene column 1.

Our invention is not limited to any particular operating pressure. It works satisfactorily at any pressure that gives a boiling point of dimethyl terephthalate above its melting point, the pressure referred to being the pressure at the top of the dimethyl terephthalate refining column 3. The column will operate satisfactorily without sublimation problems from this pressure and temperature on up to atmospheric pressure, and even above. The invention will not work at pressures where the boiling point of dimethyl terephthalate is below its melting point.

It will be obvious to those skilled in the art that several methods of controlling the rate of flow from the dimethyl terephthalate column 3 to the xylene column 1 are possible, such as orifice, Venturi, throttle valve, small line, differential pressure controller and others. It will be obvious that any of several methods of controlling the dephlegmator may be used. Some of these are cold water, cold water being heated, cold water generating steam, warm water generating steam, a refrigerant being vaporized and condensed by outside condenser and returned to the system, and others. The condensing surface in the dephlegmator can be supplied by coil, tube bundle, jacketed vessel or other means. The point of entry of the vapor line from the dimethyl terephthalate refining column into the xylene column can be varied over a wide range so long as the pressure drop across the dimethyl terephthalate column is less than the pressure drop from the base heater to the point of entry of the xylene column. The vapor from the top of the dimethyl terephthalate still can be put into the xylene column at points below the point where the pressure drop from the base heater and the xylene column is equal to the pressure drop across the dimethyl terephthalate still by throttling a flow between the base heater and the xylene column.

While we have described in detail the operation of our invention with xylene as a solvent, any solvent for dimethyl terephthalate boiling lower than the dimethyl terephthalate but high enough to be condensed by conventional means can be used, preferably solvents boiling between 125° C. and 200° C. The following are some of the other solvents which can be used in purifying dimethyl terephthalate by the process of our invention:

| Compound | Boiling Point, °C. |
|---|---|
| n-Octane | 125 |
| n-Nonane | 149 |
| n-Decane | 173 |
| n-Undecane | 194 |
| Diisobutyl ketone | 168 |
| Di-n-propyl ketone | 145 |
| Amyl methyl ketone | 151 |
| Isopropyl benzene | 153 |
| n-Propyl benzene | 158 |
| Cyclohexylamine | 134 |
| Diisobutylamine | 140 |

Our invention is also applicable to the purification of other compounds which are solid at ordinary temperatures: that is, with melting points higher than 20° C., and which sublime. In particular, it is applicable to the purification of neopentyl glycol and of ortho-phthalic anhydride, both of which are solid at ordinary temperatures and both of which sublime. In addition to xylene, any of the compounds in the above list can be used in the application of our invention to the purification of orthophthalic anhydride, and any of them boiling below 170° C. can be used in the application of our invention to the purification of neopentyl glycol.

We claim:

1. A continuous process of purifying dimethyl terephthalate contaminated with substances lower boiling and higher boiling than itself, by distillation at reduced pressure, which comprises distilling a xylene solution of the crude dimethyl terephthalate in a first distilling column, distilling off xylene at the head of the first distilling column and returning a portion of the xylene to the first distilling column as a reflux, removing impurities lower boiling than dimethyl terephthalate as a side stream from the first distilling column, overflowing dimethyl terephthalate and higher boiling impurities from the base of the first distilling column into a base heater which is connected to the first distilling column and is also connected to a second distilling column which has a dephlegmator at its head, vaporizing dimethyl terephthalate from the base heater into the second distilling column, rectifying it in the second distilling column, refluxing a portion of the dimethyl terephthalate from the base of the second column to the base heater, sludging the high boiling impurities together with some dimethyl terephthalate from the base heater, taking off purified dimethyl terephthalate as a liquid side stream from the second distilling column, and allowing a small amount of dimethyl terephthalate vapor to pass the condensing surface of the dephlegmator and re-enter the first distilling column at a point where the temperature is above the melting point of dimethyl terephthalate, and where the pressure drop from the base heater to the re-entry point in the first distilling column is greater than the pressure drop across the second distilling column whereby sublimation of the dimethyl terephthalate is prevented.

2. A process according to claim 1, in which the whole operation is carried out at pressures within the range of 10–400 mm. Hg.

3. A continuous process of purifying a compound melting above 20° C. and capable of subliming, contaminated with substances lower boiling and higher boiling than itself, by distillation at reduced pressure, which comprising distilling in a first distilling column, a solution of the crude sublimable compound in a solvent boiling between 125° C. and the boiling point of the sublimable compound, distilling off solvent at the head of the first distilling column and returning a portion of the solvent to the first distilling column as a reflux, removing impurities lower boiling than the sublimable compound as a side stream from the first distilling column, overflowing the sublimable compound and higher boiling impurities from the base of the first distilling column into a base heater which is connected to the first distilling column and is also connected to a second distilling column which has a dephlegmator at its head, vaporizing the sublimable compound from the base heater into the second distilling column, rectifying it in the second distilling column, refluxing a portion of the sublimable compound from the base of the second column to the base heater, sludging the high boiling impurities together with some of the sublimable compound from the base heater, taking off purified sublimable compound as a liquid side stream from the second distilling column, and allowing a small amount of the sublimable compound vapor to pass the the condensing surface of the dephlegmator and re-enter the first distilling column at a point where the temperature is above the melting point of the sublimable compound, and where the pressure drop from the base heater to the re-entry point in the first distilling column is greater than the pressure drop across the second distilling column whereby sublimation of the sublimable compound is prevented.

4. A process according to claim 3, in which the sublimable compound is dimethyl terrephthalate.

5. A process according to claim 3, in which the sublimable compound is neopentyl glycol.

6. A process according to claim 3, in which the sublimable compound is orthophthalic anhydride.

References Cited in the file of this patent

UNITED STATES PATENTS

| | | |
|---|---|---|
| 2,646,393 | Hughes et al. | July 21, 1953 |
| 2,795,537 | Kemp et al. | July 11, 1957 |
| 2,894,021 | Siggel | July 7, 1959 |